United States Patent [19]

Uebbing

[11] Patent Number: 5,016,027

[45] Date of Patent: May 14, 1991

[54] LIGHT OUTPUT POWER MONITOR FOR AN LED PRINTHEAD

[75] Inventor: John J. Uebbing, Palo Alto, Calif.

[73] Assignee: Hewlett-Packard Company, Palo Alto, Calif.

[21] Appl. No.: 445,404

[22] Filed: Dec. 4, 1989

[51] Int. Cl.[5] .............................................. H04N 1/21

[52] U.S. Cl. .................................. 346/107 R; 355/202

[58] Field of Search ...................... 346/76 L, 108, 160; 355/202

[56] References Cited

U.S. PATENT DOCUMENTS 4,780,731 10/1988 Creutzmann et al. .............. 346/108

4,878,072 10/1989 Reinten ................................ 346/160

4,897,672 1/1990 Horiuchi et al. ............... 346/107 R

OTHER PUBLICATIONS

Siemans Information Systems, Inc., "LED Image Generator", 1988.

*Primary Examiner*—Mark J. Reinhart

[57] ABSTRACT

A light output monitor for a light emitting diode printhead has a light detector internal to the printhead for measuring the light output power of each light emitting diode along a printhead. Calibration factors relating the light output power measured by the detector to the light output power transmitted to the photoreceptive surface of the printer are stored in memory on the printhead. An exposure control device regulates the amount of time each light emitting diode in the printhead exposes the photoreceptive surface with light. A processor periodically and aperiodically uses the light output measurements and the calibration factors to compensate the exposure control device for light output power non-uniformities and temporal irregularities.

20 Claims, 3 Drawing Sheets

LIGHT OUTPUT POWER MONITOR FOR AN LED PRINTHEAD

FIELD OF THE INVENTION

This invention is directed generally to a print quality regulator for a character generating electrophotographic printhead, and more specifically, to an apparatus and method for improving the uniformity of an LED printhead's light output power by periodically detecting and adjusting the light output of individual LEDs within the printhead.

BACKGROUND OF THE INVENTION

An LED printhead is part of a non-impact printer which employs an array of light emitting diodes (commonly referred to herein as LEDs) for exposing a photoreactive surface. The resulting pattern impressed upon the photoreactive surface is then transferred onto paper, or like material, in a way well known in the art.

In a typical LED printer, a row, or two closely spaced or staggered rows, of minute LEDs are positioned near an elongated lens array so that their images are focused onto the surface to be illuminated. The LEDs are driven by constant current integrated circuit power supplies which are switched on or off to create the desired image on the photoreactive surface.

In such a printer, all of the LEDs must produce substantially similar light output power (LOP) to produce a uniform print quality. However, left uncompensated, the light output of LEDs can vary greatly. Non-uniformities are introduced to the LOP in a variety of ways.

One cause of non-uniformities in LED output power is the variation in LED efficiency (light output as a function of current) due to the materials used in the LED wafers and fabrication of the LEDs themselves. Another cause of non-uniformities is variations in the drive current supplied by integrated power supplies due to similar concerns. These non-uniformities are inherent in the light output of the LEDs and they exist regardless of controlling other operating parameters such as temperature.

These non-uniformities are typically eliminated by individually calibrating the exposure time of each LED, thereby ensuring that the light output power for each LED exposure is approximately uniform. This is accomplished by measuring the LOP of each printhead LED, calculating the exposure time for each LED needed to produce a uniform LOP, and storing the calculated values in memory on the printer itself. Thereafter, when the printer is in use, these pre-determined values are used to control the exposure time of the LEDs.

This "one time" calibration of LED exposure power is often insufficient where precision LOP is required Temporal instability in the LED light output produces non-uniformities that must be eliminated on a periodic basis. One source of temporal instability is the long-term degradation of the LED light output power as the total LED on-time increases. This degradation is caused by the increase in the concentration and/or the cross section of non-radiative recombination centers near the LED junction. The concentration and type of crystalline defects associated with this recombination depends on many factors related to the fabrication of the LEDs and the magnitude of the degradation varies from LED to LED.

A second temporal instability is caused by the variation of LED light output power due to the heating and cooling of the entire printhead in use and to ambient temperature changes. For example, under normal operation, the printhead as a whole may see up to a 30° C. temperature rise which will cause a 27% loss in LOP.

A third source of temporal instability is the variation in LOP from LED to LED over short periods of time due to spatially varying power inputs into the LED printhead. Such non-uniformities are caused by the local heating of each LED as it and its neighbor LEDs are turned on and off. While the long-term temporal instabilities occur on the order of hundreds of hours, the short term spatially varying instabilities occur on the order of seconds. All of these non-uniformities must be corrected in a high precision and high speed printer.

U.S. Pat. No. 4,780,731, to Creutzmann discloses an electrophotographic printer that incorporates a "one time" calibration of LED exposure power on an LED-to-LED basis. The electrographic printer also includes a photoresponsive element positioned for acquiring the LOP transmitted onto the recording medium. To be precise, the photodetector element is positioned outside of the lens and is thus susceptible to toner build-up on its photoreactive surface. Also, the photodetector element is swivelably secured to the printhead and must be pivoted into the path of the focused light emitted from the lens each time the LOP is measured, thus adding to the mechanical complexity of the printhead. The LOP measured by the photodetector element is used periodically, in conjunction with the other operating parameters, to uniformly define a common operating parameter, such as LED drive current, for all of the LEDs. The assignee of the Creutzmann patent, Siemens Aktieageseilschaft, has published data specifications for a product implementing the subject matter of the Creutzmann patent which further discloses that several LED drive currents may be defined for each of a plurality of groups of LEDs. The printer thus compensates for the long-term temporal instabilities in the printhead which are uniform to all LEDs, or groups of LEDs.

However, as previously described, high precision printers are susceptible to other temporal instabilities that vary from LED to LED. It is desirable, therefore, to provide an LOP monitor and feedback system for an LED printhead that intermittently compensates for non-uniformities in LOP on an LED-to-LED basis, or at least in groups of LEDs.

SUMMARY OF THE INVENTION

Thus, there is provided in practice of this invention according to a presently preferred embodiment, a light output power monitor for an light emitting diode printhead having a row of light emitting diodes (LEDs) and a lens array for focusing light from the LEDs onto a photoreactive surface. The light output of each LED is controlled by modulating the exposure time of the LEDs supplied by a substantially constant current for all of the LEDs. The monitor has a detection means positioned between the LED array and the lens for measuring the light output power of the LEDs. Calibration memory means permanently store the ratio of LED power detected by the detection means and the power transmitted to the photoreactive surface. Exposure control means regulate the amount of time during which each LED is activated or deactivated. Correction means calculate exposure data for the exposure control means corresponding to each LED in response to the light output power measured by the detection means and calibration ratios for each LED stored in the calibration means.

BRIEF DESCRIPTION OF THE DRAWINGS

These and other features and advantages of the present invention will be better understood by reference to the following detailed description when considered in connection with the accompanying drawings wherein.

DETAILED DESCRIPTION

Figure 1:
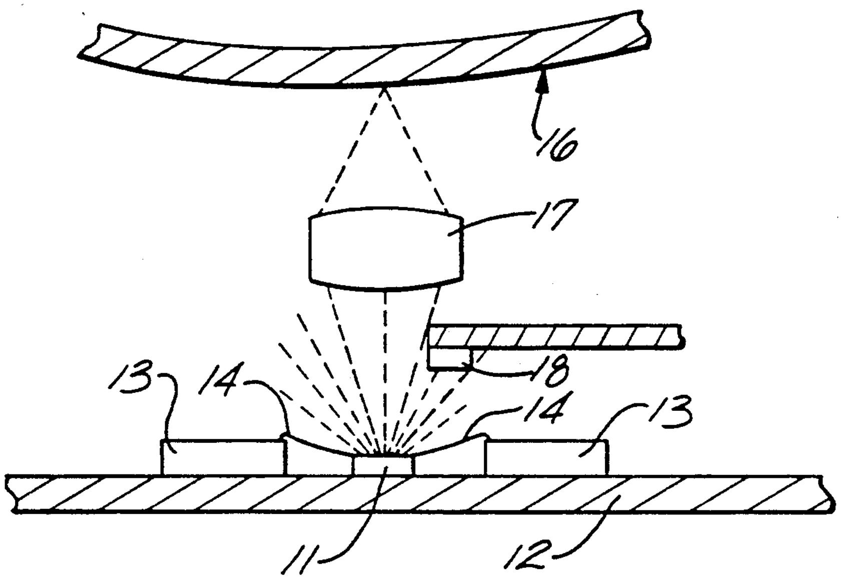
FIG. 1 is a schematic representation of a longitudinal view of an embodiment of an LED printhead and related components.

Referring to FIG. 1, a row of light emitting diodes (LEDs) 11 can be viewed from the end of an exemplary printhead in a printer assembly. FIG. 1 is merely a schematic representation showing the relative positioning of various elements within a printhead. In such an exemplary embodiment, the row of LEDs includes 4992 individual LEDs formed on 39 semiconductor LED chips, each chip having 128 LEDs. The LED chips are bonded to a plurality of tiles 12 and the tiles are placed side-to-side on the printhead to form the row of LEDs 11. Integrated circuit driver chips 13 are attached to the tiles on either side of the LEDs. The driver chips 13 contain circuitry to control the illumination of the LEDs in the LED chips. Other circuitry necessary for control are not shown in this figure. The driver chips are electrically connected to the LED chips with wire bonds 14.

In an exemplary embodiment of the present invention, only a section of the LED row may be activated. For example, although the printhead may have 39 LED chips with 4992 total LEDs, an embodiment may only activate 4864 LEDs on the first 38 LED chips. Further, the number of LEDs activated may be a number which is not a multiple of 128. For example, 4820 LEDs may be activated, where all of the LEDs on 37 LED chips are used, and only 84 of the 128 LEDs on the thirty-eighth LED chip is used. The number of LEDs activated for a particular implementation depends upon the desired image width to be printed.

Illumination from the LED chips is focused onto a photoresponsive surface 16 by a conventional lens array 17 running the length of the row of LEDs. Samples of the LED light output are absorbed by a photodetector 18 which is located on the printhead inside of the lens array. The internal placement of the photodetector protects its detecting surface from collecting pollutants, such as printing toner, which can corrupt LOP measurement. These samples are used by the light output power monitor and control circuitry to regulate the illumination of the LEDs.

Figure 2:
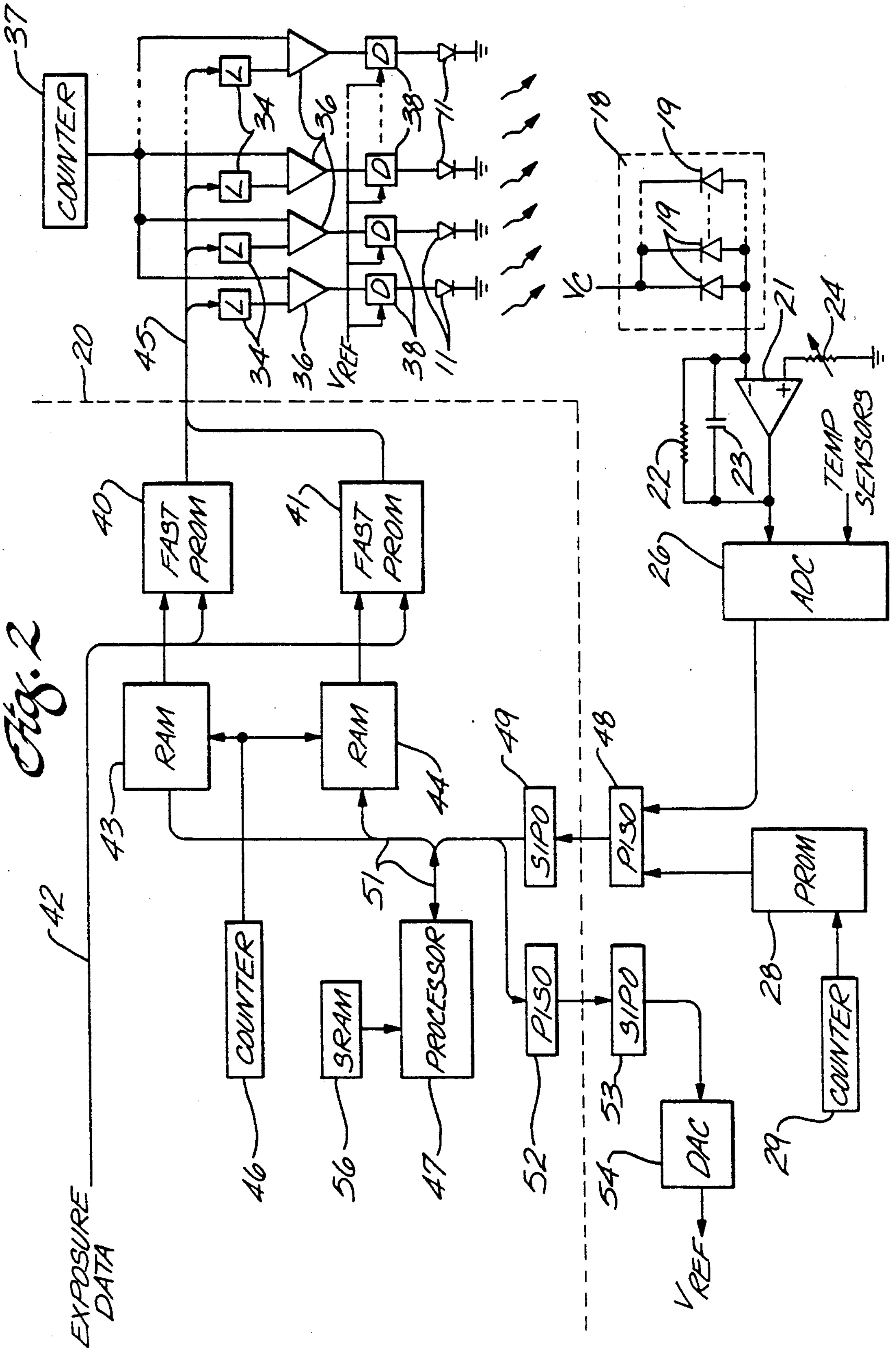
FIG. 2 is a block diagram of the LP monitor circuit.

FIG. 2 shows a block diagram of the light output power monitor along with associated components in the printer assembly. The dashed line 20 represents the boundary between the printhead and the rest of the printer assembly. All elements shown below and to the right of the dashed line reside on the printhead itself. The photodetector 18 has an array of photodiodes 19 running the length of the row of LEDs. All of the photodiodes are connected in parallel. The cathode of each photodiode is connected to a common voltage $V_c$ while the anode of each photodiode is connected to the non-inverting input of an operational amplifier (op-amp) 21. In an exemplary embodiment, fifty photodiodes are used to make up the photodetector 18. The photodiodes indiscriminately sense LOP from any of the LEDs. For example, when light from one of the LEDs 11 illuminate the photodetector 18, one or more of the photodiodes 19 are activated and begin to generate a current. The parallel orientation of the photodiodes causes the current generated in each photodiode to be added together to produce a composite LOP measurement. Thus, assuming that two LEDs have comparable LOP, the photodetector will produce comparable LOP measurements for each LED even if one LED is aligned adjacent to a photodiode 19, and the other LED is aligned somewhere between two photodiodes 19 in the photodetector 18.

A feedback resistor 22 and feedback capacitor 23 are connected between the inverting terminal and the output terminal of the op-amp 21. The non-inverting terminal of the op-amp is connected to one end of an offset resistor 24. The other end of the offset resistor is connected to ground. The op-amp 21 amplifies the current generated by the detector and converts it to a voltage. The offset resistor 24 provides an adjustable offset setting for the op-amp 21.

The output of the op-amp is connected to an input of a multi-channel analog to digital converter (ADC) 26 which converts the analog voltage representation of the detected light measured by the detector to a 10-bit digital word. In an exemplary embodiment, the ADC 26 has six channels. One channel is used to convert the light output power data from the operational amplifier 21, and the other five channels are used to convert temperature information from temperature sensors placed throughout the printhead.

By turning on a single LED with a standard drive current, the light output power (LOP) of the LED is measured. The resulting value is digitally subtracted from the value of the LOP measured at a time when no LEDs are turned on. Likewise, the LOP of the very same LED can be measured on the far side of the lens array 17 shown in FIG. 1 (i.e. in the proximity of the photoreactive surface 16). This measurement represents the light output power that appears at the photoreactive surface 16. These measurements are used to calculate drive factor ratios where the drive factor (DF) for each LED equals the LOP of that LED (LOP) minus the LOP with all LEDs off ($LOP_{off}$), this value then divided by the LOP of the same LED measured at the photoreactive surface ($LOP_L$), the drive factor is given by the equation:

$$DF=(LOP-LOP_{off})/LOP_L$$

In other words, the drive factor compensates for losses, etc., due to the lens system. An initial calibration of the printhead determines these losses and the resultant drive factor is stored for making corrections of LOP during operation of the printer.

The drive factor for each LED is stored in a drive factor PROM 28. The PROM contains 8k bytes of memory, each drive factor using one byte of the available memory. An address counter 29 is connected to the drive factor PROM 28 to select memory locations corresponding to the LED positions along the printhead. Since the detector 18 only measures light coming from the LEDs 11 at a point on the LED side of the lens array 17; it cannot compensate for LED-to-LED variation in the transmission of light through the lens array, or variation in exposure density caused by variation in the end-to-end spacing of the LED chips. The drive factors for each LED stored in the drive factor PROM 28 are used to compensate LOP measurements output from the ADC 26 for these variations.

In an exemplary embodiment, the exposure energy of each LED is controlled by pulse width modulation. The modulation is accomplished by loading a 6-bit parallel exposure data word 45 for each LED into a 6-bit exposure register 34 corresponding to that LED. The words loaded are the data for a line of printing. The output of each exposure register 34 is connected to one input of a comparator 36. The other input to the comparator is connected to the output of a 6-bit up/down counter 37. The output of the up/down counter 37 begins at zero, counts up to 63 and back down to zero for each line of printed image to be formed. A comparator 36 operates such that each time equality exists at its two inputs, the output of the comparator switches between two logic states. The output of each comparator is connected to a switchable current source 38 each of which provides current for an LED. The magnitude of the current is set by a reference voltage, $V_{REF}$and the time during which the current is applied to the LED is determined by the comparator 36 output.

For example, at the beginning of each exposure cycle, where an exposure cycle is the interval when one line of text is printed, the up/down counter begins to count up from zero. When the output of the up/down counter equals the value loaded into the exposure register 34 of a particular LED, the comparator 36 switches the current source 38 ON for that LED and the LED begins to produce light. The up/down counter continues to count up to 63, at which point it begins to count down to zero. When the output of the up/down counter again reaches a value equal to the number loaded into the exposure register as it counts down from 63 to 0, the comparator turns the current source OFF.

Since there is a separate exposure register 34, comparator 36 and current source 38 corresponding to each LED 11, the LOP of each individual LED can be independently controlled. In an exemplary embodiment, a separate up/down counter is used in each driver chip 13.

As previously mentioned, non-uniformities and temporal instabilities may occur in the LOP of the printhead. A non-uniformity occurs when adjacent LEDs or groups of LEDs do not produce the same LOP when supplied with equivalent current. Temporal instabilities occur when the LOP of individual LEDs or the entire printhead drift over a period of time.

To compensate for these LOP variations, a pair of correction curve Fast PROMs 40, 41 are used to compensate raw exposure data 42. The correction curve PROMs contain a family of curves which are indexed by correction curve index numbers generated by a pair of correction RAMs 43, 49. The correction curve Fast PROMs 40, 41 are addressed by the raw exposure data for each LED position, and by the seven-bit correction curve index number output of the correction RAMs 43, 44. The correction curve Fast PROMs 40, 41 operate to correct raw exposure data 42 using data stored in the correction RAMs 43, 44 and thus producing exposure data 45 for the LEDs.

The correction curves loaded in the correction curve Fast PROMs essentially create a look-up table multiplier for the two inputs to the Fast PROMs (i.e. the raw exposure data and the correction curve index numbers). The correction curve index numbers are calculated based on LOP measurements by the photodetector 18 and indicate the factor that the raw exposure data must be multiplied by to achieve the desired exposure time for each LED and thus a stable LOP output. In an exemplary embodiment, the relationship between LOP and exposure time is linear. The correction curve index number is then linearly related to the multiplier that the raw exposure data is multiplied by.

Memory locations for these memory devices are partitioned between even and odd LEDs. For example, correction curve number for odd numbered LEDs are stored in the odd correction RAM 43, and correction curve numbers for even numbered LEDs are stored in the even correction RAM 44. Likewise, exposure data for odd numbered LEDs are compensated with the odd correction curve Fast PROM 41, and exposure data for even numbered LEDs are compensated with the even correction curve Fast PROM 42. A RAM address counter 46 is connected to the address inputs of the correction RAMs 43, 44.

The correction curve index numbers are computed with a data processor 47 based on information generated by the drive factor PROM 28 and the ADC 26. The outputs of the drive factor PROM and the ADC are connected to the inputs of a local parallel-in/serial-out data register (PISO) 48. The output of the local PISO leaves the printhead and is connected to the input of a remote serial-in/parallel-out data register (SIPO) 49. The output of the remote SIPO 49 is connected to the data processor 47 via a bidirectional parallel data bus 51. The data bus is also connected to the data inputs to the correction RAMs 43, 44. This configuration provides for the transmission of data from the ADC 26 and drive factor PROM 28 to the data processor 47 and from the data processor to the correction RAMs 43, 44.

Data is returned from the data processor 47 to the printhead electronics by connecting the data bus 51 to the inputs of a remote PISO 52. The serial output of the remote PISO 52 is connected to the input of a local SIPO 53. The outputs of the local SIPO 53 are connected to an eight-bit digital-to-analog converter (DAC) 54 which produces the reference voltage $V_{REF}$.

The correction curve index numbers stored in the correction RAMs are intermittently updated while the printer is in service. New values for the correction curve index numbers are determined by one of two algorithms, a long-term compensation algorithm and a short-term compensation algorithm. The long-term compensation algorithm is performed, in an exemplary embodiment, each time power is applied to the printhead or perhaps once every day if the printer is left on around the clock. This algorithm individually measures and calibrates every LED on the printhead.

First, $V_{REF}$ is set by data from the data processor 47 to a standard value used each time the LOP is calibrated. Next, the first LED is turned on and the LOP is measured by the detector 18 and converted to a digital representation by the ADC 26. Next, the drive factor corresponding to the first LED is read from the drive factor PROM 28. The next step is to calculate, using integer arithmetic, the correction curve index number ($C_N$) for the first LED. The data processor 47 takes the measured LOP and the drive factor (DF) for the first LED and computes the curve number by $$C_N=(DF\cdot 127/LOP)-127$$

The correction curve index number is then stored in the odd correction RAM 43 and the process is repeated for each LED position, the only deviation being that curve numbers for even numbered LEDs are stored in the even correction RAM 44. Some of the LOP measurements are stored in scratch pad memory for use in the short-term compensation algorithm. A random access memory 56 is connected to the data processor for this purpose.

The correction curve index numbers stored in the correction RAMs 43 and 44 are used by the correction curve Fast PROMs 41, 42 to compensate the raw exposure data 42 until the correction curve index numbers are updated. These numbers are periodically updated between long-term compensation by performing the short-term compensation algorithm. It should be understood that the monitoring process implementing these algorithms can also be performed aperiodically. In an exemplary embodiment, the short-term algorithm is performed between each printed page. Because of time limitations, it may not be feasible to measure each of the LED's light output power that often. Therefore, the LEDs are divided into groups and the LOP of only one LED from each group is measured. The single LOP measurement for each group is used to calibrate the LOP for each LED in the group.

In an exemplary embodiment, the LOP of one LED per LED chip is measured, and in the short-term algorithm that measurement is used to calibrate all of the LEDs on that LED chip. Therefore, the LOP of thirty-nine individual LEDs will be measured. It should be understood that it is not necessary for this many measurements to occur. Temporal instabilities can be removed from the printhead LOP with as little as six individual LOP measurements per printhead for most printer applications.

For the sake of simplicity, the short-term algorithm is described using 38 LED groups of 128 LEDs each (i.e., the row of 4864 active LEDs of the entire row of 4992 LEDs, is divided into six groups). This algorithm requires both the current LOP ($LOP_{new}$) and the previous LOP ($LOP_{old}$) for each of the six measurements. Thus, the applicable LOP measurements are stored in scratch pad memory 56. This algorithm also reads curve correction index number data from the correction RAMs. Generally, the short-term algorithm measures the LOP of one LED and uses that measurement to calculate correction curve index numbers ($C_N$) for that LED and the 127 LEDs that follow it. This is repeated for the remaining 37 groups of 128 LEDs along the printhead. The algorithm for calculating correction curve index numbers for each LED group in the above embodiment is

```
factor =    (LOP_old · 255)/LOP_new
for i =     0 to 127
C_N[i] =    factor · (C_N[i] + 127)/255) − 127
next i
```

The number of active LEDs and size of the LED groups may differ in alternative embodiments. Accordingly, the short-term algorithm may be generalized as follows:

```
for h =        0 to x − 1
for i =        0 to y − 1
factor[h] =    (LOP_old[y · h] · 255)/LOP_new[y · h]
C_N[h,i] =     factor[h] · (C_N[h,i] + 127)/255) − 127
next i
next h
```

where x equals the number of LED groups and y equals the number of LEDs in each group.

The long-term compensation and the short-term compensation methods described above overcome shortcomings of the prior art wherein the LOP of the LEDs were uniformly compensated on an interim basis. The present invention allows for the individual compensation of each LED, or groups of LEDs, on an interim basis. In doing so, the present invention corrects for long-term and short-term temporal instabilities, such as aging and local temperature variations, that individually effect LEDs.

In addition to these two algorithms which compensate the LOP based on measurement of LOP, the present invention also compensates LOP based on measurement of printhead temperature. In an exemplary embodiment, five temperature sensors are connected to the printhead in the vicinity of the LEDs. The temperature sensors are connected to the ADC 26 to produce a digital word that can be manipulated by the data processor 47. A rise in temperature will cause a lower LOP at a constant LED drive current. Thus, when a rise in temperature occurs, the data processor adjusts the reference voltage $V_{REF}$ by changing the digital inputs to the DAC 54. $V_{REF}$ in turn, uniformly adjusts the current sources to produce a larger current for the LEDs.

This compensation method is used in conjunction with the LOP monitoring system where the temperature compensation provides a fairly rough correction and the LOP monitoring system provides fine tuning to enhance the printhead LOP.

For example, in an exemplary embodiment, the LED printhead is initially compensated for focusing losses in the lens array 17 by measuring the light output power of each LED and determining a correction drive factor for each LED. The drive factor for each LED is stored on the printhead and used in the operation of the printhead so that the ON-time of each LED is proportional to the respective stored drive factors. Long-term instabilities are roughly compensated by measuring the temperature of the printhead in the vicinity of the LEDs and then adjusting the current supplied to the LEDs. Long-term instabilities are further corrected by intermittently measuring the light output power of each LED and selecting a correction curve for each LED in response to the measured light. The ON-time of each LED is thereafter adjusted in proportion to the respective selected correction curve. Short-term instabilities in the light output power of the printhead are corrected by intermittently, over a relatively shorter interval than the long-term correction, measuring the light output power of a representative LED in a group of LEDs. These measurements are used to individually select a correction curve for each LED within the group in response to the light output power of the represenative LED. The ON-time of each LED is then adjusted in proporation to the newly selected correction curve.

Figure 3:
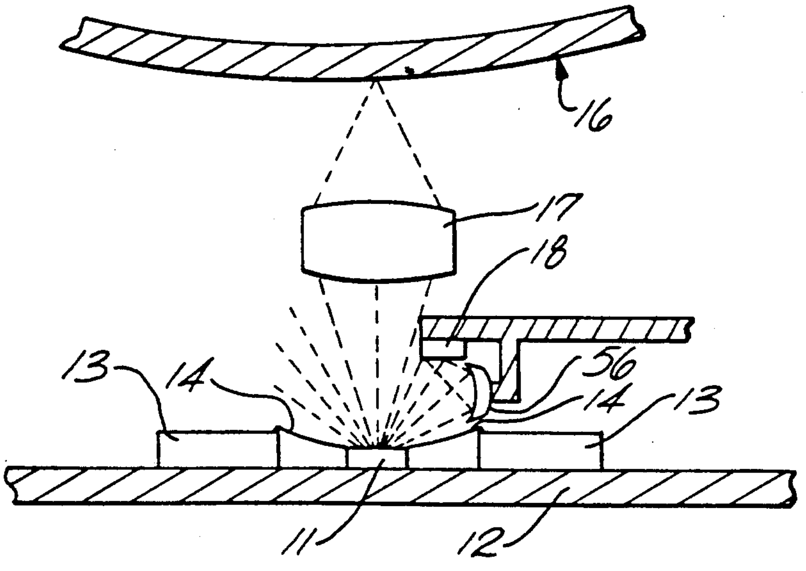
FIGS. 3 and 4 illustrate alternate embodiments of the LED printhead shown in FIG. 1.
Figure 4:
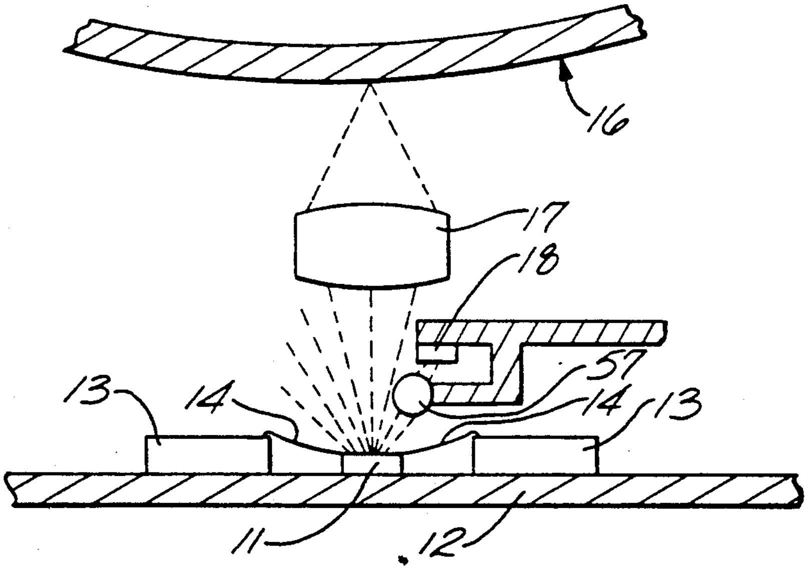

In the exemplary embodiment shown in FIG. 1, the detector is placed directly in the path of the light emanating from the LEDs. Alternative embodiments are shown in FIGS. 3 and 4 wherein the light from the LED is focused onto the detector via an elongated elliptical mirror 56 and a cylindrical detector lens 57, respectively. Use of these focusing methods reduces the size of the photodiodes 14 needed in the detector to produce an LOP measurement. The placement of the photodetector in each of these embodiments overcomes shortcomings in the prior art which required that the detector swivel into a position where it could measure LOP. In the present no moving parts are required to perform LOP measurements.

It should be apparent to one skilled in the art that other embodiments exist that are within the nature and principle of this invention. For example, other arrangements can be imagined to focus light from the LED onto the detector surface. Further, within the framework of the present invention, additional algorithms may be used to compensate for particular inconsistencies in the printhead LOP. One example is the use of arbitrary correction curve contents in the correction curve PROMs 43, 44 along with a variable frequency up/down counter 37 to accommodate highly nonlinear electrophotographic process corrections. It is, therefore, intended that the above description shall be read as illustrative and not as limited to the preferred embodiments as described herein.

What is claimed is:

1. A light output power monitor for an LED printhead which has an array of individually time modulated LEDs for exposing a photoreactive surface through a lens array, comprising:

detector means for detecting light output power of each LED in the LED array;

calibration means for storing calibration ratios corresponding to the loss of light output power through the lens array for each LED;

means for selectively supplying current to each LED;

exposure control means for individually regulating the activation and deactivation times of each current supply means in response to modified exposure data; and correction means coupled to the exposure control means for acquiring raw exposure data, light output values from the detection means and calibration ratios from the calibration memory means and individually defining modified exposure data for each LED controlled by the exposure control means based on the detected light output values, the raw exposure data and the stored calibration ratios.

2. A light output power monitor as recited in claim 1 wherein the detector means is located inside the printhead.

3. A light output power monitor as recited in claim 2 wherein the detector means is immovably secured in the printhead.

4. A light output power monitor as recited in claim 1 wherein the correction means comprises:

processing means for calculating index numbers corresponding to each LED based on the light output values and calibration ratios;

memory means for storing the index numbers; and multiplier means coupled to the memory means and exposure control means for correcting the raw exposure data corresponding to each LED based on the calculated index numbers corresponding to each LED, each index number selecting a unique multiplication curve, a point on which comprises the modified exposure data selected by the correction means based on the raw exposure data.

5. A light output power monitor as recited in claim 4 wherein the multiplier means comprises a programmable read-only-memory.

6. A light output power monitor as recited in claim 1 wherein the detection means detects the light output power of selected LEDs in the LED array.

7. A light output power monitor as recited in claim 1 further comprising:

temperature sensing means for measuring the printhead temperature; and compensation means coupled to the temperature sensing means and the current supply means for uniformly adjusting the current supplied to each LED in response to the printhead temperature.

8. An LED printhead comprising:

illumination means for generating unfocused light in response to exposure data;

photoreactive means for generating an image in response to light;

means for focusing the unfocused light from the LEDs onto the photoreactive means; and monitor means for detecting the unfocused light and for compensating the exposure data to remove non-uniformities and temporal instabilities in the focused light, the monitor means including calibration memory means for storing calibration ratios corresponding to the loss of light output power through the focusing means.

9. An LED printhead as recited in claim 8 further comprising means for concentrating a portion of the unfocused light onto the monitor means.

10. An LED printhead as recited in claim 9 wherein the concentrating means comprises an elliptically shaped mirror.

11. An LED printhead as recited in claim 9 wherein the concentrating means comprises a optical lens.

12. An LED printhead as recited in claim 9 wherein the monitor means comprises a row of photodiodes connected in parallel along the printhead.

13. An LED printhead as recited in claim 9 wherein the illumination means comprises a plurality of light emitting diodes in a row along the printhead.

14. An LED printhead as recited in claim 13 further comprising means for compensating for variations in light output power of each light emitting diode due to light output power loss through the focusing means.

15. A method for stabilizing the light output power from a plurality of light emitting diodes on a light emitting diode printer wherein each diode is illuminated for a length of time determined by a raw exposure value and a correction curve, the method comprising the steps of:

providing current to each light emitting diode for a calibrating length of time;

measuring the light output power of each light emitting diode;

selecting a correction curve for each light emitting diode in response to the measured light output power;

calculating modified exposure data as a function of the raw exposure data and the selected correction curve;

thereafter, each time each light emitting diode is illuminated, adjusting the time each light emitting diode is turned ON in proportion to the modified exposure data; and repeating the providing current, measuring and selecting steps.

16. A method as recited in claim 15 wherein the repeating step is performed each time power is applied to the printer.

17. A method for stabilizing the light output power from a plurality of light emitting diodes on a light emitting diode printer for printing images on paper sheets wherein each diode is illuminated for a length of time determined by a raw exposure value and a correction curve, the method comprising the steps of:

providing current to each light emitting diode for a calibrating length of time;

dividing the plurality of light emitting diodes into groups;

measuring the light output power of one light emitting diode within each group;

selecting a correction curve for each light emitting diode in a group in response to the measured light output power of the measured light emitting diode in that group;

calculating modified exposure data as a function of the raw exposure data and the selected correction curve;

thereafter, each time each light emitting diode is illuminated, adjusting the time each light emitting diode is turned ON in proportion to the modified exposure data; and repeating the providing current, measuring and selecting steps periodically.

18. A method as recited in claim 17 wherein the repeating step is performed in the time between each printed sheet.

19. A method as recited in claim 17 wherein the repeating step is performed aperiodically.

20. A method for minimizing light output variations in an LED printhead in which LED output is pulse width modulated, comprising the steps of:

measuring light output power of each LED in an array of LEDs and determining a correction drive factor for each LED;

storing the drive factor for each LED;

adjusting the time each LED is turned ON in proportion to the respective stored drive factor;

intermittently over a relatively longer interval measuring light output power of each LED;

selecting a correction curve for each LED in response to the intermittently measured light output power;

adjusting the time each LED is turned ON in proportion to the respective selected correction curve;

intermittently over a relatively shorter interval measuring light output power of a representative LED in a group of LEDs;

changing the correction curve, as appropriate, for each LED in the group in response to the light output power of the representative LED;

adjusting the time each LED is turned ON in proportion to the changed correction curve in lieu of the selected correction curve;

measuring temperature in the vicinity of the LEDs; and adjusting current for the LEDs in response to changes in temperature.

* * * * *